US011083137B2

(12) United States Patent
Vandike et al.

(10) Patent No.: US 11,083,137 B2
(45) Date of Patent: Aug. 10, 2021

(54) RETURN PAN GRAIN PRESENTATION TO A SENSOR

(71) Applicant: Deere & Company, Moline, IL (US)

(72) Inventors: Nathan R. Vandike, Geneseo, IL (US); Adam J. Donohoe, Bettendorf, IA (US); Michael T. Meschke, Geneseo, IL (US)

(73) Assignee: Deere & Company, Moline, IL (US)

( * ) Notice: Subject to any disclaimer, the term of this patent is extended or adjusted under 35 U.S.C. 154(b) by 572 days.

(21) Appl. No.: 15/967,733

(22) Filed: May 1, 2018

(65) Prior Publication Data

US 2019/0335669 A1 Nov. 7, 2019

(51) Int. Cl.
*A01F 12/46* (2006.01)
*A01D 41/127* (2006.01)

(52) U.S. Cl.
CPC ............ *A01F 12/46* (2013.01); *A01D 41/127* (2013.01); *A01D 41/1272* (2013.01)

(58) Field of Classification Search
CPC .......... A01F 12/46; A01F 12/30; A01F 12/44; A01F 12/446; A01F 12/52; A01F 12/305; A01D 41/127–1278
See application file for complete search history.

(56) References Cited

U.S. PATENT DOCUMENTS

| 4,311,995 | A | * | 1/1982 | Kinzie | A01D 41/1276 340/607 |
|---|---|---|---|---|---|
| 4,360,998 | A | * | 11/1982 | Somes | A01D 41/1271 460/5 |
| 4,517,792 | A | * | 5/1985 | Denning | A01D 41/1273 460/5 |
| 4,875,889 | A | * | 10/1989 | Hagerer | A01D 75/282 460/1 |
| 4,897,071 | A | * | 1/1990 | Desnijder | A01D 75/282 460/10 |
| 4,951,031 | A | * | 8/1990 | Strubbe | A01D 41/1273 340/684 |
| 5,791,986 | A | * | 8/1998 | Underwood | A01F 12/44 460/101 |
| 6,056,639 | A | | 5/2000 | Gryspeerdt et al. | |
| 6,238,285 | B1 | | 5/2001 | Gryspeerdt et al. | |
| 6,839,616 | B2 | * | 1/2005 | Beck | A01D 41/1271 56/10.2 R |
| 7,976,369 | B2 | * | 7/2011 | Craessaerts | A01F 12/448 460/6 |

(Continued)

FOREIGN PATENT DOCUMENTS

| EP | 1479280 A1 | 11/2004 |
|---|---|---|
| EP | 2156727 A2 | 2/2010 |

(Continued)

OTHER PUBLICATIONS

English Translation for WO 2018/039997 (Year: 2018).*
European Search Report issued in counterpart European Patent Application No. 19169573.3 (dated Aug. 23, 2019) (6 pages).

*Primary Examiner* — Thomas B Will
*Assistant Examiner* — Joan D Misa

(57) ABSTRACT

A return pan for an agricultural harvester has an inclined upper surface portion, disposed to receive grain from a threshing or separating mechanism and laterally convey grain under the force of gravity to an inlet of a grain flow sensor.

14 Claims, 4 Drawing Sheets

(56) References Cited

U.S. PATENT DOCUMENTS

| | | | |
|---|---|---|---|
| 8,118,649 B1* | 2/2012 | Murray | A01F 12/28 |
| | | | 460/5 |
| 9,345,197 B2* | 5/2016 | Biggerstaff | A01D 41/127 |
| 9,629,310 B2* | 4/2017 | Bilde | A01F 12/30 |
| 10,085,379 B2* | 10/2018 | Schleusner | G01S 13/867 |
| 10,257,983 B2* | 4/2019 | Bilde | A01F 12/48 |
| 10,785,910 B2* | 9/2020 | Vandike | A01D 41/1272 |
| 2015/0080069 A1* | 3/2015 | Fuchs | A01D 41/1273 |
| | | | 460/1 |
| 2017/0055456 A1* | 3/2017 | Reinecke | A01D 75/282 |
| 2017/0248453 A1* | 8/2017 | Herlitzius | A01F 12/32 |
| 2017/0311547 A1* | 11/2017 | Fuchs | A01D 41/1276 |
| 2020/0029498 A1* | 1/2020 | Vandike | A01F 12/444 |
| 2020/0077582 A1* | 3/2020 | Xu | A01F 7/04 |
| 2020/0196531 A1* | 6/2020 | Hermann | A01F 12/446 |

FOREIGN PATENT DOCUMENTS

| | | |
|---|---|---|
| EP | 3238527 A1 | 11/2017 |
| WO | 2016166016 A1 | 10/2016 |
| WO | 2018039997 A1 | 3/2018 |

* cited by examiner

RETURN PAN GRAIN PRESENTATION TO A SENSOR

RELATED APPLICATIONS

There are no related applications.

FIELD OF THE INVENTION

This invention relates to agricultural harvesters. More particularly, it relates to return pans for agricultural harvesters. Even more particularly, it relates to sensors for sensing the passage of grain on return pans.

BACKGROUND OF THE INVENTION

Agricultural harvesters are designed to travel through agricultural fields and harvest grain. In order to monitor the operation of the various components of the agricultural harvester, sensors are mounted in locations where they can sense the passage of grain to determine characteristics of the grain, such as quantity, location, and physical characteristics of the grain (size, moisture content, and the like).

Grain sensors can be located to detect the passage of grain from a threshing and/or separating mechanisms to a cleaning shoe. The threshing mechanism in an agricultural harvester breaks grain loose from the surrounding plant matter (also known as material other than grain or "MOG"). The separating mechanism separates the grain from the MOG. The cleaning mechanism cleans the grain of any smaller MOG particles, which are commonly called chaff.

The return pan is located in the flow of grain between the threshing and separating mechanism and the cleaning mechanism. Its function is to convey the threshed and separated grain forward, underneath the threshing and separating mechanism, and to deposit the threshed and separated grain onto a forward region of the cleaning mechanism. This arrangement allows the threshing and separating mechanism to be located above rather than behind the cleaning mechanism, and therefore permits the agricultural harvester to be shorter than it otherwise would be. The return pan may also include conveying elements fixed to its upper surface that convey the loose grain in a forward direction toward the forward region of the cleaning mechanism.

In order to catch all of the threshed and separated grain falling downward from the threshing mechanism and the separating mechanism, return pans are relatively wide (1 m, typically) and long (2 m, typically). Grain falling over such a wide area could require a correspondingly large sensor. Large sensors, however, are expensive. Furthermore, large sensors are not as responsive to individual impacts of grain. The trend, therefore, is to provide return pan sensors that are much smaller in sensing area. Unfortunately, this means that they do not sense grain falling on remote regions of the return pan.

What is needed, therefore, is an arrangement for accumulating grain in greater thicknesses on the return pan and directing those greater thicknesses of grain onto smaller sensors. It is an object of this invention to provide such a return pan.

SUMMARY OF THE INVENTION

In accordance with a first aspect of the invention, a return pan for an agricultural harvester having a threshing mechanism, a separating mechanism and a grain cleaning mechanism, and a chassis is provided, the return pan including a generally planar and rectangular upper surface disposed in a generally horizontal orientation underneath the separating mechanism and above the grain cleaning mechanism, wherein the upper surface defines a rear end of the return pan and is configured to receive grain from the separating mechanism and to convey the received grain forwardly, and wherein the upper surface further defines a front end of the return pan configured to discharge forwardly conveyed grain onto the cleaning mechanism; and a first sensor supported at the upper surface and extending only partway across the width of the return pan wherein the first sensor generates a signal indicating a relative quantity of grain passing adjacent the first sensor; wherein the upper surface is upstream of the first sensor and comprises a first region with a first inclined surface that uses gravity to steer grain laterally toward an inlet of the first sensor.

A second sensor may be supported at the upper surface and may extend only partway across the width of the return pan. The second sensor may generate a signal indicating a relative quantity of grain passing adjacent the second sensor. The upper surface may be upstream of the second sensor and may include a second region with a second inclined surface that uses gravity to steer grain laterally toward an inlet of the second sensor.

The first inclined surface may steer grain in a first lateral direction across the upper surface. The second inclined surface may steer grain in a second lateral direction opposite the first lateral direction across the upper surface, The first inclined surface and the second inclined surface may separate a flow of grain on the upper surface into a first divergent flow path and a second divergent flow path.

One of the two divergent flow paths may direct grain over the first sensor and a second divergent flow path may direct grain over the second sensor.

The first inclined surface may extend at an angle of between 10 and 30 degrees in a lateral direction and may extend at an angle of between 10 and 30 degrees in a fore-and-aft direction.

Each of the first inclined surface and the second inclined surface may extend at an angle of between 10 and 30 degrees in a lateral direction and may extend at an angle of between 10 and 30 degrees in a fore-and-aft direction.

In accordance with a second aspect of the invention, a return pan for an agricultural harvester having a rotor for threshing and separating grain, a cleaning shoe, and a chassis supporting the cleaning shoe and the rotor is provided, the return pan including a generally flat and horizontal upper surface disposed underneath the rotor and above the cleaning shoe, wherein the upper surface is adjacent a rear end of the return pan, wherein the upper surface is disposed to receive grain from the rotor and to convey the received grain forwardly, and wherein the upper surface further defines a front end of the return pan that is configured to discharge forwardly conveyed grain into the cleaning shoe; and a first sensor supported at the upper surface and extending only partway across the width of the return pan wherein the first sensor generates a signal indicating a relative quantity of grain passing over the upper surface of the first sensor.

At least a portion of the upper surface may be upstream of the first sensor and may include a first region with a first inclined surface that uses gravity to steer grain laterally across the upper surface and toward an inlet of the first sensor.

A second sensor may be supported at the upper surface and may extend only partway across the width of the return pan. The second sensor may generate a signal indicating a relative quantity of grain passing adjacent the second sensor. The upper surface may be upstream of the second sensor and may include a second region with a second inclined surface that uses gravity to steer grain laterally toward an inlet of the second sensor.

The first inclined surface may steer grain in a first lateral direction across the upper surface and the second inclined surface may steer grain in a second lateral direction opposite the first lateral direction across the upper surface. The first inclined surface and the second inclined surface may separate a flow of grain on the upper surface into a first divergent flow path and a second divergent flow path.

10. The return pan of claim 9, wherein one of the first divergent flow path and the second divergent flow path directs grain over the first sensor and the second divergent flow path directs grain over the second sensor.

The first inclined surface may extend at an angle of between 10 and 30 degrees in a lateral direction and may extend at an angle of between 10 and 30 degrees in a fore-and-aft direction.

Each of the first inclined surface and the second inclined surface may extend at an angle of between 10 and 30 degrees in a lateral direction and may extend at an angle of between 10 and 30 degrees in a fore-and-aft direction.

At least a portion of the first inclined surface may be a saw tooth conveyor having sawtooth ridges extending laterally across the first inclined surface and may be oriented to convey grain in a rearward direction when the return pan is oscillated in a fore-and-aft direction.

At least a portion of each of the first inclined surface and the second inclined surface may be a saw tooth conveyor having sawtooth ridges extending laterally across the first inclined surface and may be oriented to convey grain in a rearward direction when the return pan is oscillated in a fore-and-aft direction.

DETAILED DESCRIPTION OF THE PREFERRED EMBODIMENTS

Figure 1:
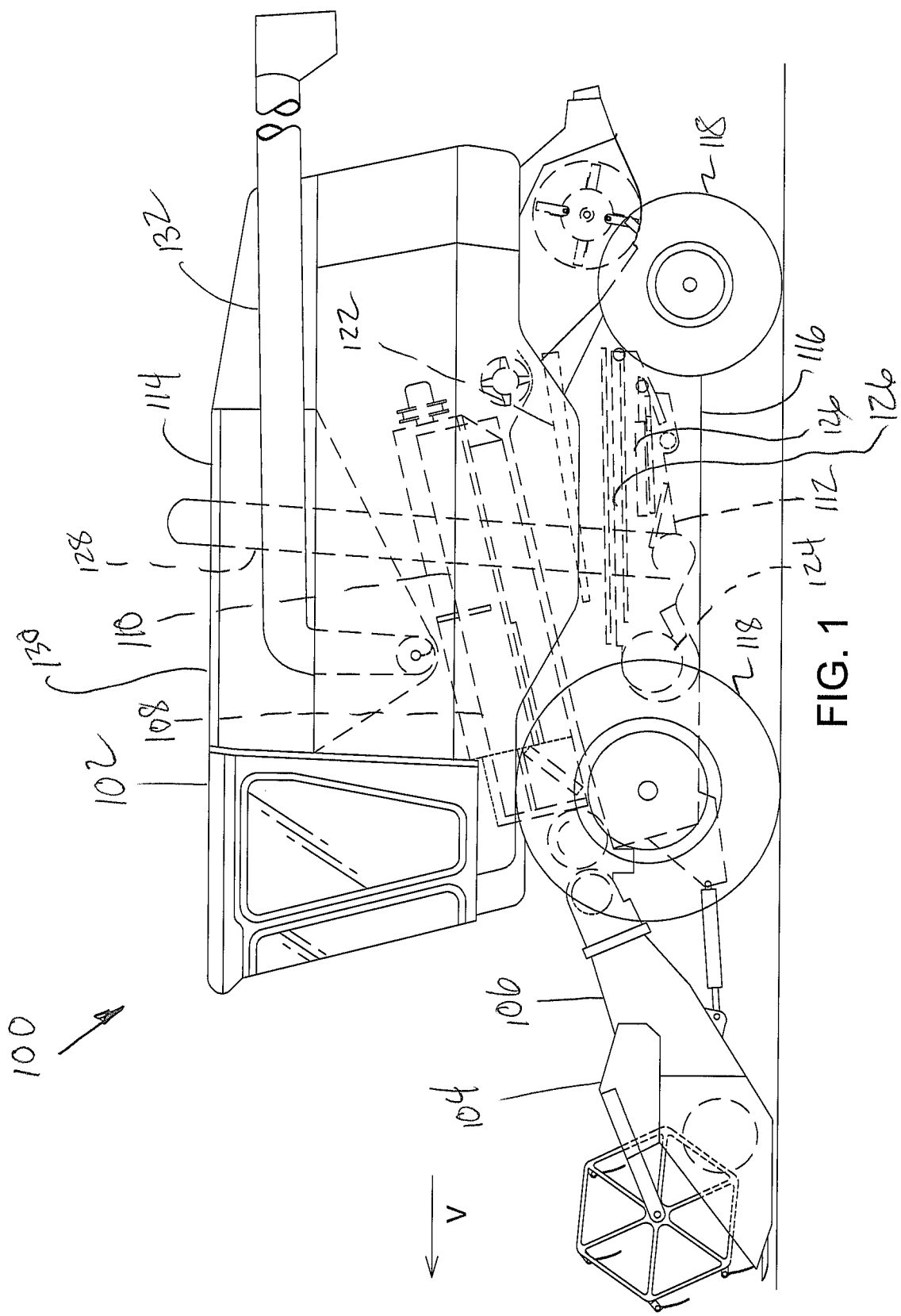
FIG. 1 is a side view of an agricultural harvester in accordance with the present invention.

An agricultural harvester 100 comprises a self-propelled vehicle 102 and a harvesting implement 104 mounted on the front of the vehicle 102. The implement 104 is supported on a feederhouse 106 that extends forward from the front of the vehicle 102.

The vehicle 102 comprises a threshing mechanism 108, a separating mechanism 110, a cleaning mechanism 112 and a storage tank 114.

The components of the vehicle 102 are supported on a chassis 116, which in turn is supported on wheels or tracks 118 which carry the vehicle 102 for travel through the field harvesting crops.

Crops growing in the agricultural field being harvested by the agricultural harvester 100 are severed from the ground by a reciprocating knife that extends across the front of the harvesting implement 104. The cut crop material fall rearward onto a lateral conveyor which conveys the crops inwardly to a central region of the harvesting implement 104. The cut crop material is then carried rearward through an aperture in the frame of the harvesting implement 104, and into the feederhouse 106 which has an internal conveyor. The cut crop material exits the feederhouse 106 and is conveyed into the threshing mechanism 108, where the cut crop material is threshed, breaking the grain loose from the remainder of the crop plant. The cut crop material passes through the threshing mechanism 108 and is then conveyed to the separating mechanism 110, which separates the now-loose grain from the remainder of the crop plant. The now-separated loose grain falls downward onto a return pan 122 that is disposed between the separating mechanism 110 and the cleaning mechanism 112. Grain falling on the return pan 122 is conveyed forward to a front end of the return pan 122, where it falls off the leading edge of the return pan 122 and onto the cleaning mechanism 112. The cleaning mechanism 112 includes a cleaning fan 124 and an arrangement of sieves and/or chaffers 126 that blow the crop residue off the grain and carry it rearward, while letting the grain itself fall through the sieves and/or chaffers 126 to the bottom of the cleaning mechanism 112.

The now-clean grain slides downward into a transverse auger at the bottom of the cleaning mechanism 112, which is coupled to a clean grain elevator 128. The clean grain elevator 128 carries the clean grain upward and releases it into the storage grain tank 114 for storage. Grain is periodically emptied from the grain tank 130 by an unloading conveyor 132.

Figure 2:
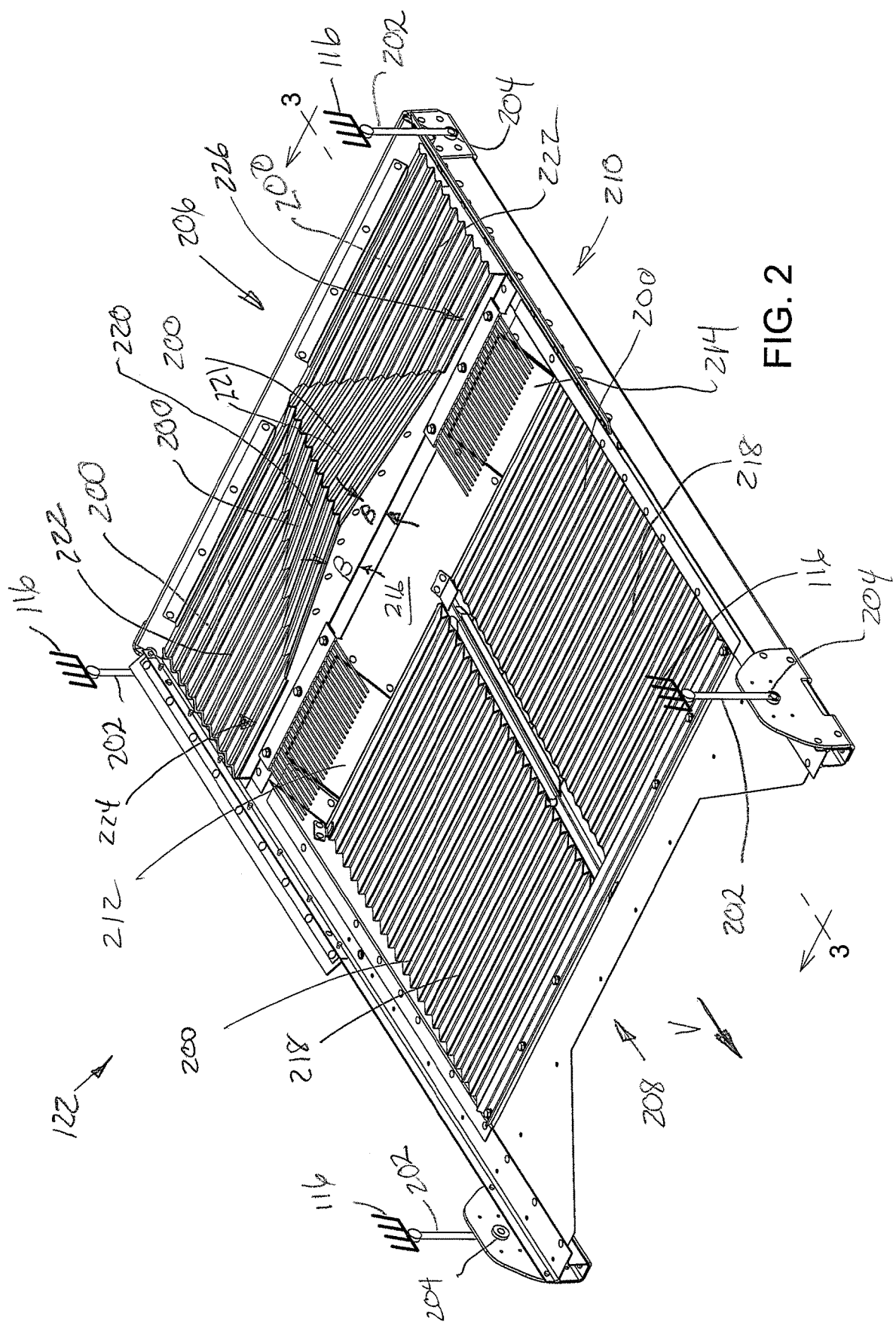
FIG. 2 is a perspective view of a return pan of the agricultural harvester of FIG. 1.
Figure 3:
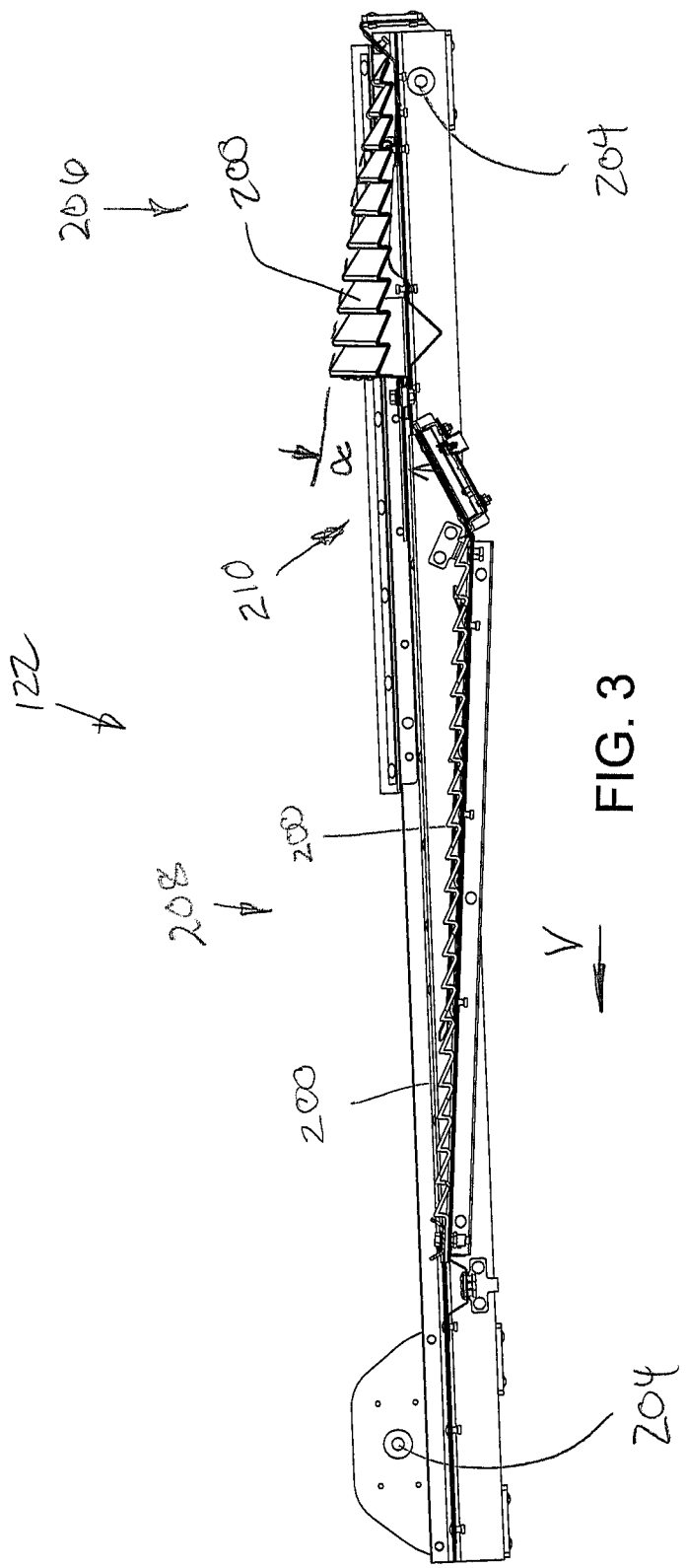
FIG. 3 is a cross sectional view of the return pan of FIGS. 1 and 2 taken at section line 3-3 in FIG. 2.

Referring to FIG. 2, return pan 122 is thin and generally rectangular. It has an upper surface with a plurality of sawtooth ridges 200 that extend laterally across substantially the entire width of the return pan 122.

The return pan 122 is suspended on four links 202 disposed at the four corners of the return pan 122. The upper ends of these four links 202 are coupled to the chassis 116 either directly or through intermediate elements (other links) such that the return pan 122 can oscillate forward and backward with respect to the chassis of the agricultural harvester 100. These links have pivot joints 204 disposed at one end that couple them to the return pan 122 itself. The sawtooth ridges 200 function as conveyors that convey the grain rearward as the return pan 122 is oscillated fore-and-aft at the ends of the four links 202.

The return pan 122 has a first region 206, a second region 208, and a transition region 210. The first region 206 is disposed at the rear of the return pan 122. The second region 208 is disposed at the front of the return pan 122. The transition region 210 is disposed between and abuts the first region 206 and the second region 208.

Two sensors 212, 214 are disposed in the transition region 210 in a side-by-side, spaced apart relationship. The two sensors 212, 214 are generally rectangular and are disposed at an angle of approximately 30° with respect to the surface of the first region 206 and the second region 208. The two sensors 212, 214 are separated by a planar and non-sensing portion 216 of the return pan 122. The overall width of the two sensors is less than half the width of the return pan 122 itself.

Sensors 212, 214 may be of the acoustic type, in which grain falling on the upper surface of the sensors deflects the surface of the sensors and this deflection is sensed by an acoustic sensing element such as a microphone or piezoelectric device.

The second region 208 comprises two rectangular planar pans 218, each pan 218 having a plurality of the sawtooth ridges 200 arranged in rows and extending from side to side across the width of the pan 218.

The first region 206 likewise has a plurality of the sawtooth ridges 200 arranged in rows and extending from side to side across the width of the return pan 122. Unlike the second region 208, central portions 220, 221 of the first region 206 are disposed at an inclined angle with respect to two adjacent and abutting outer portions 222.

Central portions 220, 221 are disposed at an angle (beta) in a lateral direction and are disposed at an angle (alpha) in a fore-and-aft direction. Angle beta is preferably between 10 and 30°. Angle alpha is preferably between 10 and 30°. This inclination of the central portions 220, 221 causes grain falling upon the central portions 220, 221 to move laterally and outwardly under the force of gravity.

As the return pan 122 oscillates fore-and-aft on its links, grain falling on central portion 220 slides sideways and accumulates in a channel 224 disposed upstream of the sensor 212. This gathers the grain into a thick layer at the inlet of sensor 212. As the return pan 122 oscillates, grain falling on central portion 221 slides sideways and accumulates in the second channel 226 disposed upstream of the sensor 214. This gathers another portion of the grain into a thick layer at the inlet of sensor 214.

By using gravity to convey the grain sideways and direct the grain to the inlets of the sensors, smaller return pan sensors can be employed, and the signals generated by the return pan sensors (due to the larger quantity of grain passing across them) are stronger.

In the arrangement of FIG. 2, the central portions 220, 221 split the grain falling on the first region 206 into two separate flows of grain which diverge from each other and which flow onto two different sensors 212, 214.

Figure 4:
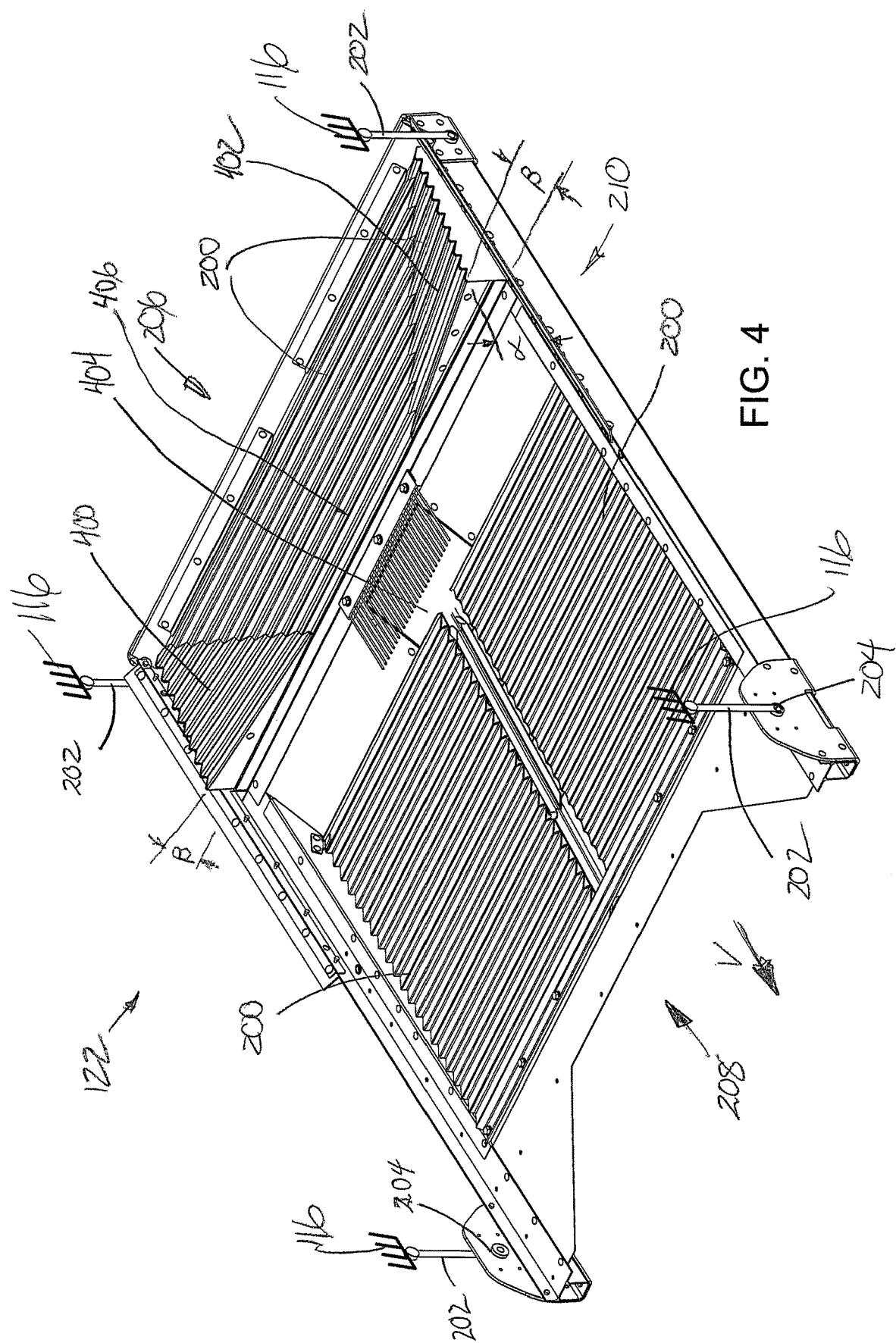
FIG. 4 is a perspective view of an alternative return pan in accordance with the present invention.

The arrangement of FIG. 4 is the same as that of FIG. 2, in that it uses inclined surfaces 400, 402 (similar to the inclined surfaces of central portions 220, 221) to direct the flow of grain laterally under the force of gravity as the return pan oscillates in the same way. In the arrangement of FIG. 4, however, the inclined surfaces 400, 402 are disposed on the sides of the return pan 122, and are inclined to direct the flow of grain inwardly towards the central region (longitudinal midline) of the return pan 122 to the inlet of a single return pan sensor 404 located laterally in the middle of the return pan. Sensor 404 is constructed the same as sensors 212, 214.

The invention claimed is:

1. A return pan for an agricultural harvester having a threshing mechanism, a separating mechanism and a grain cleaning mechanism, and a chassis, the return pan comprising:
   a generally planar and rectangular upper surface disposed in a generally horizontal orientation underneath the separating mechanism and above the grain cleaning mechanism, wherein the upper surface defines a rear end of the return pan and is configured to receive grain from the separating mechanism and to convey the received grain forwardly, and wherein the upper surface further defines a front end of the return pan configured to discharge forwardly conveyed grain onto the cleaning mechanism; and
   a first sensor supported at the upper surface and extending only partway across the width of the return pan wherein the first sensor generates a signal indicating a relative quantity of grain passing adjacent the first sensor;
   wherein a portion of the upper surface is upstream of the first sensor and comprises a first region with a first inclined surface that uses gravity to steer grain laterally toward an inlet of the first sensor.

2. The return pan of claim 1, further comprising:
   a second sensor supported at the upper surface and extending only partway across the width of the return pan, wherein the second sensor generates a signal indicating a relative quantity of grain passing adjacent the second sensor, and
   wherein the portion of the upper surface is upstream of the second sensor and comprises a second region with a second inclined surface that uses gravity to steer grain laterally toward an inlet of the second sensor.

3. The return pan of claim 2, wherein the first inclined surface steers grain in a first lateral direction across the upper surface and wherein the second inclined surface steers grain in a second lateral direction opposite the first lateral direction across the upper surface, and further wherein the first inclined surface and the second inclined surface separate a flow of grain on the upper surface into a first divergent flow path and a second divergent flow path, respectively.

4. The return pan of claim 3, wherein one of the two divergent flow paths directs grain over the first sensor and the second divergent flow path directs grain over the second sensor.

5. The return pan of claim 2, wherein each of the first inclined surface and the second inclined surface extend at an angle of between 10 and 30 degrees in a lateral direction and extends at an angle of between 10 and 30 degrees in a fore-and-aft direction.

6. The return pan of claim 2, wherein at least a portion of each of the first inclined surface and the second inclined surface is a saw tooth conveyor having sawtooth ridges extending laterally across the first inclined surface and oriented to convey grain in a rearward direction when the return pan is oscillated in a fore-and-aft direction.

7. The return pan of claim 1, wherein the first inclined surface extends at an angle of between 10 and 30 degrees in a lateral direction and extends at an angle of between 10 and 30 degrees in a fore-and-aft direction.

8. The return pan of claim 1, wherein at least a portion of the first inclined surface is a saw tooth conveyor having sawtooth ridges extending laterally across the first inclined surface and oriented to convey grain in a rearward direction when the return pan is oscillated in a fore-and-aft direction.

9. A return pan for an agricultural harvester having a rotor for threshing and separating grain, a cleaning shoe, and a chassis supporting the cleaning shoe and the rotor, the return pan comprising:
   a generally flat and horizontal upper surface disposed underneath the rotor and above the cleaning shoe, wherein the upper surface is adjacent a rear end of the return pan, wherein the upper surface is disposed to receive grain from the rotor and to convey the received grain forwardly, and wherein the upper surface further defines a front end of the return pan that is configured to discharge forwardly conveyed grain into the cleaning shoe; and
   a first sensor supported at the upper surface and extending only partway across the width of the return pan wherein the first sensor generates a signal indicating a relative quantity of grain passing over the upper surface of the first sensor;
   wherein at least a portion of the upper surface is upstream of the first sensor and comprises a first region with a first inclined surface that uses gravity to steer grain laterally across the upper surface and toward an inlet of the first sensor.

10. The return pan of claim 9, further comprising:
a second sensor supported at the upper surface and extending only partway across the width of the return pan, wherein the second sensor generates a signal indicating a relative quantity of grain passing adjacent the second sensor, and
wherein the portion of the upper surface is upstream of the second sensor and comprises a second region with a second inclined surface that uses gravity to steer grain laterally toward an inlet of the second sensor.

11. The return pan of claim 10, wherein the first inclined surface steers grain in a first lateral direction across the upper surface and wherein the second inclined surface steers grain in a second lateral direction opposite the first lateral direction across the upper surface, and further wherein the first inclined surface and the second inclined surface separate a flow of grain on the upper surface into a first divergent flow path and a second divergent flow path, respectively.

12. The return pan of claim 11, wherein one of the first divergent flow path and the second divergent flow path directs grain over the first sensor and the second divergent flow path directs grain over the second sensor.

13. The return pan of claim 10, wherein each of the first inclined surface and the second inclined surface extend at an angle of between 10 and 30 degrees in a lateral direction and extends at an angle of between 10 and 30 degrees in a fore-and-aft direction.

14. The return pan of claim 9, wherein the first inclined surface extends at an angle of between 10 and 30 degrees in a lateral direction and extends at an angle of between 10 and 30 degrees in a fore-and-aft direction.

* * * * *